United States Patent [19]

Teijido et al.

[11] Patent Number: 4,843,803
[45] Date of Patent: Jul. 4, 1989

[54] COMPACT COMBINE DRIVE SYSTEM

[75] Inventors: Joseph A. Teijido, East Moline; Charles E. Cook, Hampton; Dennis M. Roe, Coal Valley, all of Ill.

[73] Assignee: Deere & Company, Moline, Ill.

[21] Appl. No.: 193,434

[22] Filed: May 12, 1988

Related U.S. Application Data

[63] Continuation of Ser. No. 50,972, May 15, 1987, abandoned.

[51] Int. Cl.⁴ .......................... A01F 7/00; A01F 12/56
[52] U.S. Cl. ...................................... 56/14.6; 56/13.5; 56/16.6
[58] Field of Search ....................... 56/11.9, 10.2, 13.5, 56/16.6, 10.7, 14.6, 11.6

[56] References Cited

U.S. PATENT DOCUMENTS

| | | | |
|---|---|---|---|
| 2,999,347 | 9/1961 | Horne et al. | 56/14.6 |
| 3,483,685 | 12/1969 | Guillotin | 56/6 |
| 3,540,028 | 11/1970 | Love | 56/14.6 |
| 3,546,860 | 3/1970 | Pool et al. | 56/10.2 |
| 3,599,407 | 8/1971 | Bichel | 56/16.6 |
| 3,609,947 | 10/1971 | Herbsthofer | 56/10.2 |
| 3,619,997 | 11/1971 | Wood | 56/14.6 |
| 3,885,375 | 5/1975 | Solterbeck | 56/11.9 |
| 4,067,343 | 1/1978 | Muijs et al. | 56/16.6 |
| 4,241,566 | 12/1980 | Webster | 56/14.6 |
| 4,317,326 | 3/1982 | Riedinger | 56/14.6 |
| 4,407,162 | 2/1985 | Bouchi et al. | 56/14.6 |
| 4,428,182 | 1/1985 | Allen et al. | 56/16.6 |
| 4,583,354 | 4/1986 | Kracl | 56/16.6 |

Primary Examiner—Paul J. Hirsch

[57] ABSTRACT

A drive system for the internal combustion engine of a large work vehicle, such as a self-propelled agricultural combine. The drive system comprising three concentric drive shafts that are housed in a housing for driving three separate usage assemblies. The outer and middle drive shafts are provided with bevel gear assemblies having output axes perpendicular to the drive shafts axis. The bevel gear assembly of the outer drive shaft is coupled to a series of four sequentially mounted hydraulic pumps, whereas the bevel gear assembly of the middle drive shaft is coupled to a forwardly extending drive shaft. An internal clutch is provided for operatively engaging and disengaging the middle drive shaft from the drive train.

17 Claims, 4 Drawing Sheets

COMPACT COMBINE DRIVE SYSTEM

This application is a continuation of application Ser. No. 050,972, filed May 15, 1987 now abandoned.

BACKGROUND OF THE INVENTION

1. Field of the Invention

The present invention is directed to a compact drive system for a large work vehicle, such as an agricultural combine. The drive system is provided with three concentric drive shafts which direct power to three separate usage assemblies.

2. Description of the Prior Art

Large work vehicles, such as agricultural combines, may have a single internal combustion engine for both propelling the vehicle and powering various usage assemblies for performing work. In a relatively traditional design, an agricultural combine is provided with a transversely mounted engine having a drive sheave that extends outwardly through the side sheet of the combine. The drive sheave is coupled to countershafts through belts which in turn drive the various usage assemblies. These usage assemblies include the propulsion motors, the threshing and separating means, and the harvesting means. The propulsion motors may either be driven by a belt directly or through an intermediate hydrostatic pump.

Although belt drive systems have proven to be effective means of transmitting power to the combine's various operating means, they do increase the transverse front of the machine. In Europe, there are strict regulations regulating the maximum allowable transverse front of a machine at three meters. As such, a combine with a transverse engine and transverse mounted operating means must sacrifice transverse threshing and separating area to accommodate the power transmitting systems.

SUMMARY OF THE INVENTION

The present invention reduces this problem by providing a compact driving system for a transversely mounted engine having three concentric driving shafts. The three concentric shafts are housed in a single housing. Both the inner shaft and outer shaft are always live when the engine is turning, but the middle shaft is provided with a clutch which is also housed in the casing for coupling and decoupling the middle shaft to the engine. The inner shaft extends from the casing through the side sheet of the combine and is provided with a sheave for driving the unloading auger assembly. The unloader auger assembly is provided with a swing arm for coupling and decoupling the output of the inner shaft to and from the unloading auger assembly.

The outer shaft is provided with a first bevel gear assembly located inside the casing which directs the output of the outer shaft longitudinally backward. Four "piggyback" hydraulic pumps are operatively mounted to the output of the first bevel gear assembly for driving hydraulic propulsion motors, pressurizing power steering hydraulic circuits and providing hydraulic pressure for other systems on the combine. The outer shaft is always live when the engine is operating so that hydraulic pressure is always available when the engine is in operation.

The middle shaft is provided with a second bevel gear assembly located in the casing which directs the output of the middle shaft longitudinally forward. This output drive shaft extends through the clean grain tank to a third bevel gear assembly adjacent to the threshing cylinder. The third bevel gear assembly drives a transverse counter shaft having sheaves at both ends. The sheaves extend beyond the side sheets of the combine and are used for driving the threshing and separating means.

By eliminating the necessity of providing treansverse sheaves for driving the propulsion motors; by providing a means for driving the threshing and separating countershaft adjacent to the threshing cylinder; and by locating the unloading auger drive assembly close to the unloading auger; the length of the V-belt runs are reduced thereby reducing the overlapping of the V-belts and reducing the transverse front needed for the operating systems driving means.

DETAILED DESCRIPTION

Figure 1:
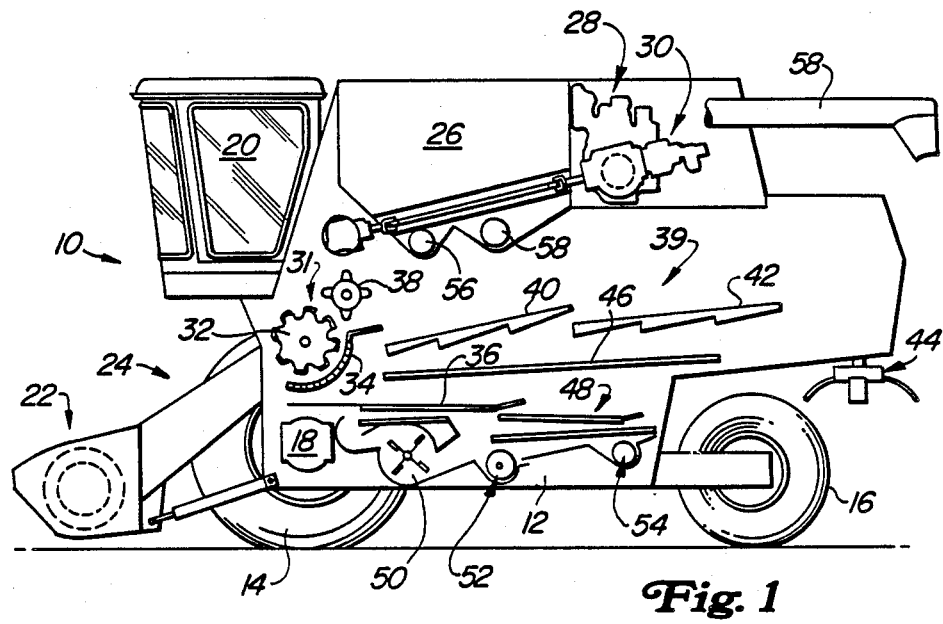
FIG. 1 is a side view of a combine schematically illustrating the operating means.
Figure 2:
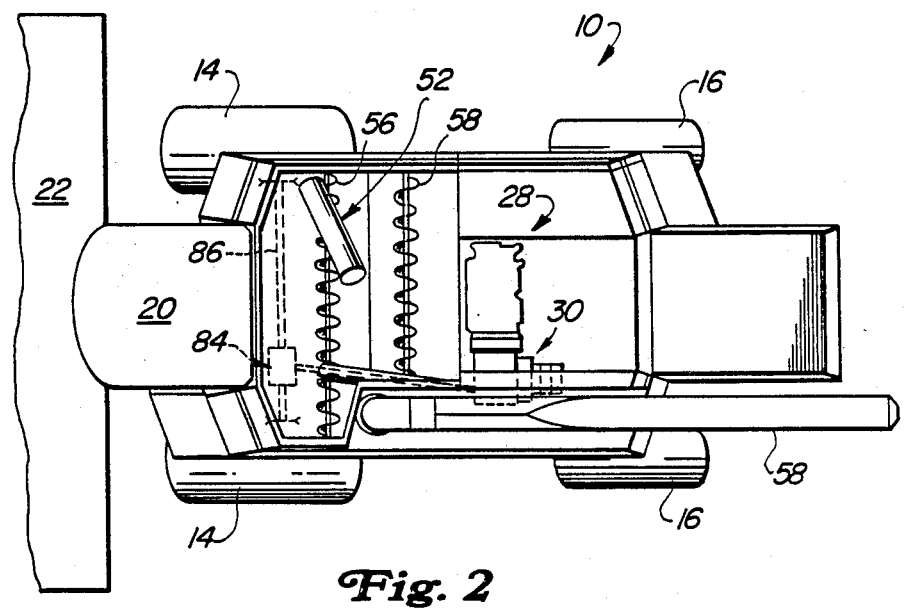
FIG. 2 is a top view illustrating the location of the engine and the driving system.

FIGS. 1 and 2 illustrate an agricultural combine 10, having a chassis 12 and ground engaging wheels 14 and 16. Forward ground engaging wheels 14 are driven by hydraulic motor 18 located between the wheels. An operator seated in operator control cab 20 controls the operation of the combine. Harvesting platform 22 extends forwardly from the chassis of the combine and is used for harvesting a crop in a field. After harvesting, the crop is then directed through feeder house 24 and into the combine. Clean grain compartment 26 is located behind the operator's cab at the top of the combine. Behind compartment 26 is transverse internal combustion engine 28 which is the prime mover of the combine, powering the propulsion means, the harvesting means, and the threshing and separating means. The internal combustion engine 28 is provided with a driving means 30 for powering the various usage assemblies.

Between the side sheets of the combine, which form the chassis of the combine, is located the threshing and separating means. The threshing and separating means separates the grain from the straw and chaff of the harvested crop. The feeder house directs the harvested grain to threshing means 31 which comprises rotating transverse threshing cylinder 32, transverse concave 34, and rotating beater 38. As the crop passes between cylinder 32 and concave 34, grain and chaff fall through the concave to pan 36 and the remaining straw and unseparated grain is advanced to beater 38.

After threshing, the straw in the crop is advanced to separating means 39. The main elements of the separating means are straw walkers 40 and 42, and cleaning shoe assembly 48. From beater 38 the crop is advanced to the oscillating straw walkers 40 and 42 which direct the straw to the rear of the combine where it is returned to the field by straw choppers 44. Grain and chaff falling through the straw walkers falls onto oscillating slanted pan 46 which directs the grain and chaff to pan 36. The grain and chaff are directed from pan 36 by overhead auger assemblies to cleaning shoe assembly 48 which is used to separate the chaff from the grain. The grain and chaff falling onto the chaffer and sieve of the cleaning shoe assembly encounters an air stream from fan 50 which blows the lighter chaff out of the rear of the combine while the heavier grain falls through the cleaning shoe assembly and into clean grain receiving auger 52.

Auger 52 directs the clean grain to a clean grain elevator (not shown) which in turn directs the grain to clean grain compartment 26. Tailings, that is unthreshed heads of grain, fall into tailings auger 54 which directs the unthreshed heads back to the threshing cylinder and concave. When the clean grain compartment is to be unloaded, transverse unloading augers 56 and 58 direct the grain to the side of the compartment from where it comes into contact with a vertical unloading auger (not shown) which directs the clean grain through unloading tube 58. During an unloading operation, tube 58 would normally be extended outwardly from the side of the combine so that clean grain can be more readily directed into a wagon or truck. It should be noted that the arrangement of the threshing and separating elements is well known, and that this invention is primarily directed to the system for driving these elements and the combine in an efficient and compact manner.

Figure 3:
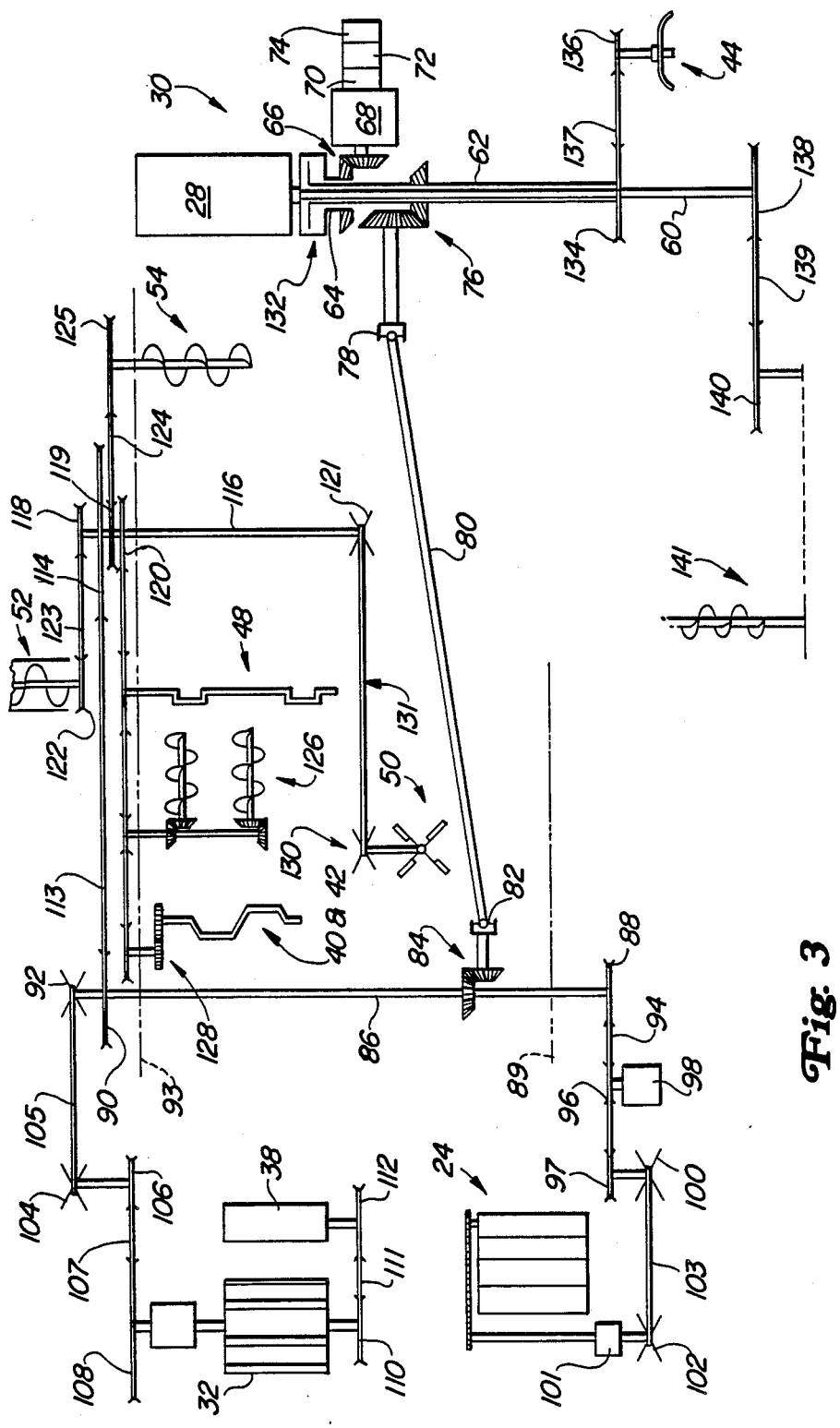
FIG. 3 is a schematic view illustrating the operating system of the combine.

The drive system is schematically illustrated in FIG. 3, together with its relationship to the operating means of the combine. Driving system 30 comprises three concentric transverse drive shafts, inner shaft 60, hollow middle shaft 62 and hollow outer shaft 64. Outer shaft 64 is provided with a first bevel gear assembly 66, the output of which is used to drive four "piggybacked" hydraulic pumps 68, 70, 72 and 74, which are marketed by Eaton Corporation. Hydraulic pump 68 is used for supplying hydraulic fluid to hydraulic propulsion motor 18 whereas pump 70 is the priming pump for pump 68. Pump 72 provides pressurized hydraulic fluid to other systems in the combine such as the hydraulic cylinder for extending the unloading auger tube 58. Hydraulic pump 74 pressurizes the hydraulic fluid for the power steering unit on the combine.

Middle shaft 62 is provided with a second bevel gear assembly 76 having an output shaft coupled to universal joint 78. Universal joint 78 is coupled to forwardly extending drive shaft 80 having a second universal joint 82 which is operatively coupled to third bevel gear assembly 84. Bevel gear assembly 84 drives first transverse countershaft 86 which is provided with left-hand sheave 88, and right-hand sheaves 90 and 92. Left-hand sheave 88 extends outside of left side sheet 89 of the chassis whereas right hand sheaves 90 and 92 extend outside of right side sheet 93 of the chassis. Left-hand sheave 88 is operatively coupled through V-belt 94 to sheaves 96 and 97. Sheave 96 drives hydraulic pump 98 for supplying pressurized hydraulic fluid to the harvesting reel whereas sheave 97 is operatively to variable sheave 100. Variable sheave 100 is operatively coupled to variable sheave 102 by V-belt 103. The two variable sheaves form a variable speed drive for controlling the speed of the feeder house. A reverser 101 is positioned between the output of variable sheave 102 and feeder house 24 for reversing the feeder house when it becomes jammed.

Right-hand sheave 92 is a variable sheave that is operatively coupled to variable sheave 104 by V-belt 105. Variable sheaves 92 and 104 form a variable speed drive for controlling the speed of threshing means 31. Sheave 104 is operatively coupled to sheave 106 having V-belt 107 for driving sheave 108 which is operatively coupled to threshing cylinder 32. The threshing cylinder in turn is operatively coupled to sheave 110 having belt 111 for driving sheave 112. Sheave 112 drives beater 38.

Sheave 90 is operatively coupled to sheave 114 by belt 113. Sheave 114 drives second transverse countershaft 116 which is provided with sheaves 118, 119, 120 and 121. Sheave 118 is operatively coupled to clean grain auger 52 by sheave 122 and belt 123. The clean grain auger in turn is operatively coupled to the clean grain elevator for directing the clean grain upwardly into the clean grain compartment. Sheave 119 drives tailing auger 54 through V-belt 124 and sheave 125. The tailings auger is operatively coupled to conveying means for returning the tailings to the threshing cylinder.

Sheave 120 drives three separating means elements through three separate driven sheaves, that is oscillating straw walkers 40 and 42, oscillating cleaning shoe assembly 48, and grain and chaff conveying augers 126 which overlie pan 36. Conveying augers 126 are used for directing the grain and chaff on pan 36 to the cleaning shoe assembly. The straw walkers are provided with gear case 128 having two meshing spur gears. Variable sheave 121 drives fan 50 through variable sheave 130 by means of belt 131, thereby providing a variable speed fan drive.

The middle shaft is also provided with clutch 132 (better illustrated in FIG. 4) for coupling and decoupling the middle shaft to the drive train. In addition, sheave 134 is mounted to the end of the middle shaft for driving straw chopper 44 through sheave 136 by means of belt 137. Therefore, when an operator wants to discontinue agricultural operations, that is harvesting, threshing, and separating, the operator decouples the middle shaft from the drive train by means of clutch 132. As such, when the middle sahft is declutched, the agricultural operations are halted, but the combine may still be driven and grain unloaded from the clean grain compartment.

Inner shaft 60 is provided with sheave 138 having V-belt 139 for driving second sheave 140 for driving the unloading auger assembly 141. V-belt 139 is a declutchable belt from sheave 138 and its structure and operation are better illustrated in FIG. 5 which will be discussed in more detail below.

Figure 4:
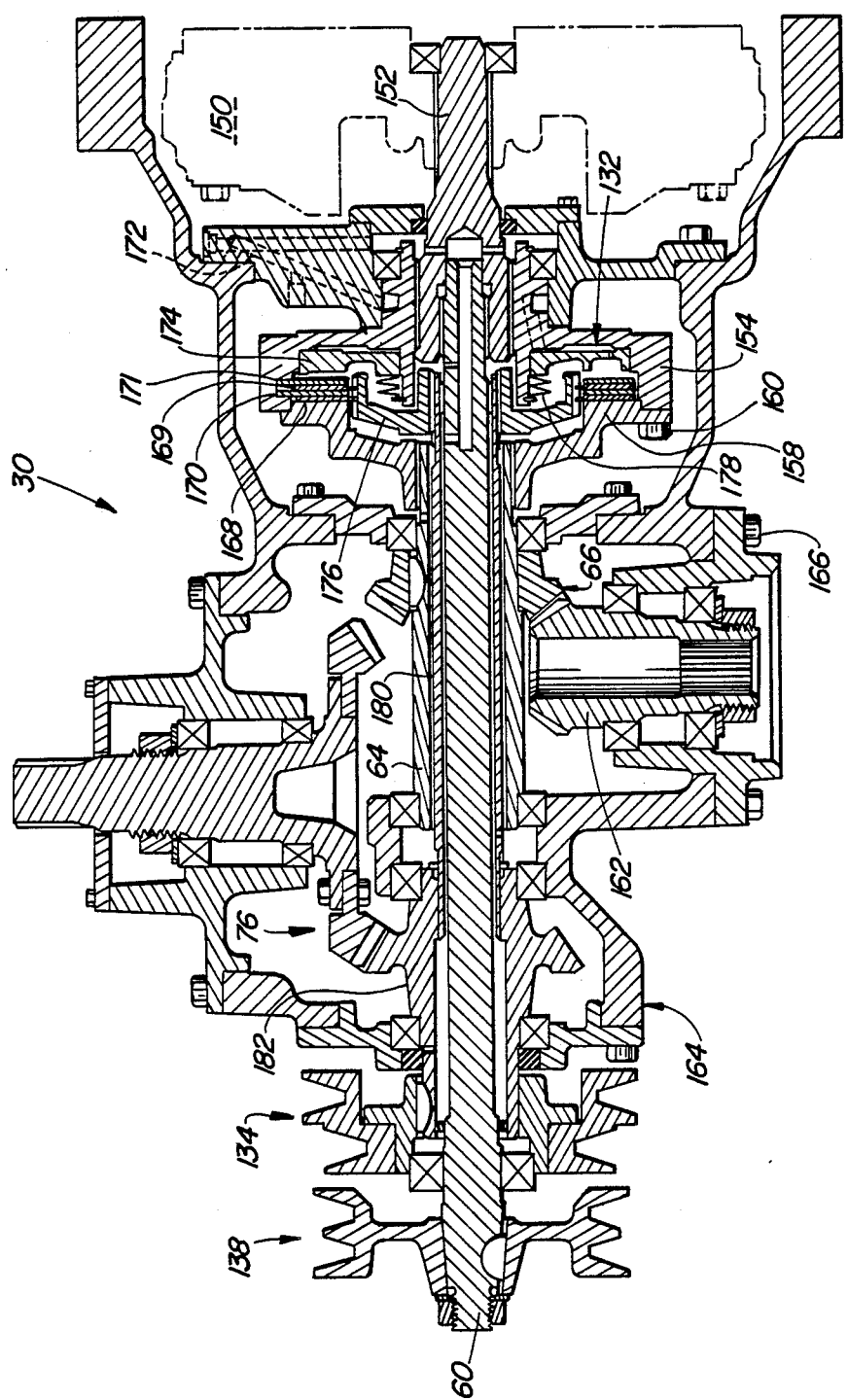
FIG. 4 is a cross sectional view of the driving system.

FIG. 4 illustrates the structural details of drive system 30. Engine flywheel 150 is provided with internal splines for gripping and operatively engaging stub shaft 152. The other end of the stub shaft is provided with internal and external splines which operatively engage inner shaft 60 and first annular plate 154. Plate 154 is coupled to second annular plate 158 by bolts 160 and is provided with internal splines for operatively engaging outer shaft 64. The outer shaft is provided with first bevel gear assembly 66 having an internally splined output stub shaft 162 for driving the four "piggybacked" hydraulic pumps (not shown in this figure) which are mounted to casing 164 by bolts 166. Inner shaft 60 is provided with double sheave 138 which extends beyond casing 164 and is used for driving the grain unloading assembly.

The middle shaft is provided with hydraulically actuated clutch 132 comprising internally splined friction plates 168 and 169 and pressure plates 170 and 171. The clutch is actuated by forcing hydraulic fluid through passage 172 which in turn presses piston 174 outwardly towards the friction and pressure plates. As the friction and pressure plates are compressed, the internal splines of the friction plates drive annular plate 176 which has an internal spline for operatively driving the middle drive shaft. Spring 178 normally biases the piston away from the clutch plates. The middle drive shaft comprises two hollow portions 180 and 182 which are operatively splined together. Portion 182 is operatively coupled to second bevel gear assembly 76 and straw chopper double sheave 134. The output shaft of bevel gear assembly 76 is provided with an external spline for engaging universal joint 78.

One of the key features of the present invention is how the two bevel gear assemblies are nested together to form a compact power transfer assembly. More specifically, by arranging the bevel gear assemblies so that the output members are opposite one another, the bevel gears can be compactly nested.

Figure 5:
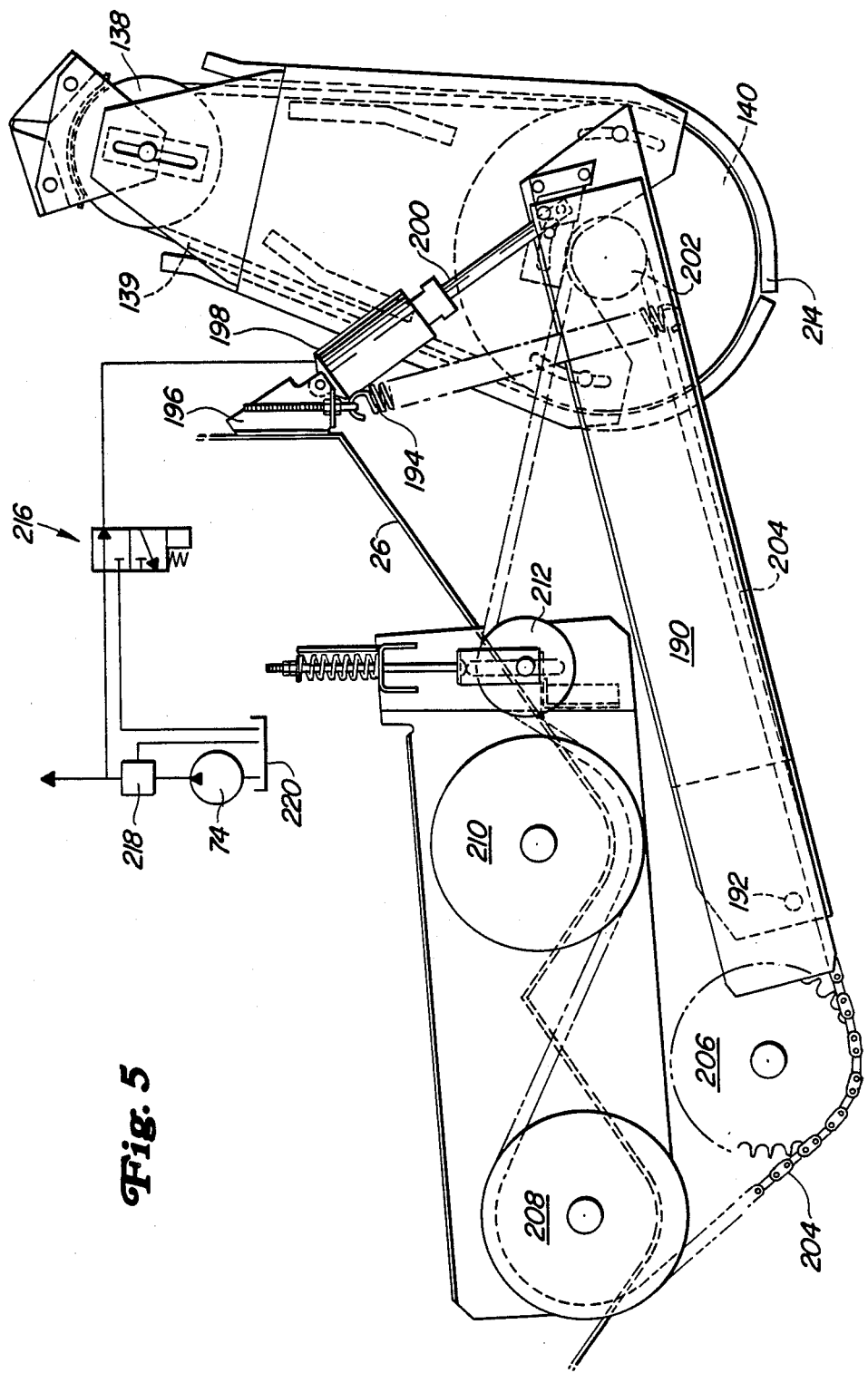
FIG. 5 is a side view of the unloading auger driving means, including a hydraulic schematic of the control system for the driving means.

FIG. 5 illustrates the clutching assembly for the clean grain unloading system 141. The clean grain unloading system is driven by sheave 138 of inner shaft 60 which is provided with belt 139 for driving second sheave 140. Sheave 140 is mounted on swing arm 190 which is pivotally coupled to the chassis of the combine at 192. The swing arm is biassed upwardly by spring 194 which is mounted to bracket 196 which is bolted to the back wall of the clean grain compartment. Hydraulic cylinder 198 having piston rod 200 is used for extending the swing arm downwardly against the biassing force.

Sheave 140 is operatively coupled to sprocket 202 which is provided with chain 204. The chain engages sprockets 206, 208, 210 and 212 for the driving unloading transverse augers and thereby driving the vertical unloading augers for directing grain from clean grain compartment 26 through tube 58. Sprocket 212 is a spring biassed idler sprocket for maintaining chain tension. The swing arm comprises a U-shaped channel for protecting the chain and sprocket 202. The V-belt itself is protected by belt guard 214.

When an operator wishes to operate the unloading auger, he energizes spring biassed solenoid valve 216 into the position indicated in FIG. 5. The hydraulic fluid passes from hydraulic pump 74 through constant pressure valve 218 to valve 216 and through valve 216 to hydraulic cylinder 198. Applying hydraulic fluid to cylinder 198 drives piston rod outwardly thereby extending the swing arm downwardly. As the swing arm is extended downwardly, the spacing between sheaves 138 and 140 increases tightening the belt 139 and causing sheave 140 to be driven by constantly rotating drive sheave 138. To disengage the unloading system, the operator deenergizes valve 216 so that the spring drives the valve into a position wherein cylinder 198 is fluidically coupled to sump 220 and the flow of hydraulic fluid to the cylinder is checked. The biasing force of the spring drives hydraulic fluid in the cylinder back to the sump and the swing arm is retracted. As the swing arm is retracted, belt guard 214 contacts the bottom of the belt and pushes it upwardly so that it becomes disengaged from sheave 138.

The simplified hydraulic circuit used in moving the swing arm is identical to the unillustrated hydraulic circuit used for manipulating hydraulic clutch 132 of the middle shaft.

The present invention should not be limited to the above-described embodiments, but rather should be limited solely to the claims that follow.

We claim:

1. A self-propelled agricultural combine for harvesting a crop from a field and threshing the harvested crop to separate grain from straw and chaff, the combine comprising:
   a chassis having a front and back;
   ground engaging means extending dowwnardly from the chassis, the ground engaging means support the chassis and when rotated drive the chassis across a field;
   a harvesting means extending from the front of the chassis, for harvesting an agricultural crop from a field;
   a threshing and separating mewans located inside the combine, for separating grain from straw and chaff;
   a feeder house for directing a harvested crop from the harvested means inside the combine to the threshing and separating means;
   a clean grain compartment is mounted to the chassis and receives the separated grain from the threshing and separating means, the clean grain compartment is provided with an unloading auger for unloading the compartment;
   a prime mover mounted on the chassis for generating rotational power;
   driving means is operatively coupled to the prime mover and comprises three concentric drive shafts, an inner drive shaft, a hollow middle drive shaft and a hollow outer drive shaft;
   transmission means having a first bevel gear assembly with a first output member, the first bevel gear assembly is operatively coupled to at least one of the drive shafts for driving a first hydraulic pump which is fluidically coupled to at least one hydraulic motor which drives the ground engaging means for propelling the vehicle; and
   coupling means having a second bevel gear assembly with a second output member, the second bevel gear assembly is operatively coupled to the output of one of the drive shafts not coupled to the transmission means for driving the harvesting means and the threshing and separating means;
   wherein the first and second output members of the bevel gear assemblies extend in opposite directions from one another.

2. An agricultural combine as defined in claim 1 wherein the first bevel gear assembly is operatively coupled to the hollow outer drive shaft for driving the first hydraulic pump.

3. An agricultural combine as defined by claim 2 wherein the second bevel gear assembly is operatively coupled to the second drive shaft for driving the harvesting means and the threshing and separating means.

4. An agricultural combine as defined by claim 3 wherein the coupling means further comprises a first sheave mounted to the first drive shaft for driving a belt for operating the unloading auger for the clean grain compartment, the unloading auger being provided with a second sheave which is driven by the first sheave through the associated belt.

5. An agricultural combine as defined by claim 4 wherein a second, a third and a fourth hydraulic pump are mounted onto the first hydraulic pump in an aligned and sequential manner and are operatively coupled to the preceding hydraulic pump for transmitting rotational power; the second hydraulic pump is a priming pump for the first hydraulic pump, the third hydraulic pump supplies hydraulic fluid to a hydraulic control system, and the fourth hydraulic pump supplies hydraulic fluid to a power steering assembly.

6. An agricultural combine as defined by claim 4 wherein the middle drive shaft is operatively coupled to the prime mover by a first clutch assembly which is used to selectively operatively couple the prime mover to and from the second drive shaft.

7. An agricultural combine as defined by claim 6 wherein the first clutch assembly comprises a series of friction plates which are forced together by a hydraulic piston and cylinder assembly which is fluidically coupled to a hydraulic pump through a control valve assembly, the control valve assembly is used for selectively engaging and disengaging of the first clutch assembly.

8. An agricultural combine as defined in claim 7 wherein the means for engaging and disengaging the belt from the first sheave comprises a swing arm on which the second sheave is mounted, the belt extends around the first and second sheaves, the second sheave is operatively coupled to the first usage assembly, the means is provided with a hydraulic cylinder for engaging the belt by pushing the swing arm and second sheave away from the first sheave thereby tensioning the belt on the sheave, and a spring for disengaging the belt by drawing the swing arm and the second sheave towards the first sheave.

9. An agricultural combine as defined by claim 8 wherein the second sheave is provided with a belt guard which when drawn toward the first sheave by the spring tends to force the belt away from the first sheave.

10. An agricultural combine as defined by claim 9 wherein the prime mover is a transverse internal combustion engine, which is located at the back of the combine behind the clean grain compartment.

11. An agricultural combine as defined by claim 10 wherein the second drive shaft that is coupled to the second bevel gear assembly extends forward from the transversely mounted internal combustion engine through the clean grain tank to a third bevel gear assembly that is operatively coupled through a transverse counter shaft to the harvesting means and the threshing and separating means.

12. An agricultural combine as defined by claim 11 wherein the transverse counter shaft has two ends each provided with a sheave on which is operatively coupled two driving belts for driving the harvesting means and the threshing and separating means.

13. A self-propelled agricultural combine for harvesting a crop from a field and threshing the harvested crop to separate grain from straw and chaff, the combine comprising:

a chassis having a front and back;
ground engaging means extending downwardly from the chassis, the ground engaging means support the chassis and when rotated drive the chassis across a field;
a harvesting means extending from the front of the chassis, for harvesting an agricultural crop from a field;
a threshing and separating means located inside the combine, for separating grain from straw and chaff;
a feeder house for directing a harvested crop from the harvesting means inside the combine to the threshing and separating means;
a clean grain compartment is mounted to the chassis and receives the separated grain from the threshing and separating means, the clean grain compartment is provided with an unloading auger for unloading the compartment;
a transverse internal combustion engine is mounted to the back of the chassis behind the clean grain compartment;
drive shaft means is operatively coupled to the internal combustion engine and comprises three concentric drie shafts, an inner drive shaft, a hollow middle drive shaft and a hollow outer drive shaft;
a first bevel gear assembly is operatively coupled to the outer drive shaft;
a second bevel gear assembly is operatively coupled to the middle drive shaft;
a third bevel gear assembly is mounted on the chassis in front of the clean grain compartment and is operatively coupled to the second bevel gear assembly by a second drive shaft means extending between the second and third bevel gear assemblies through the clean grain compartment; and
a transverse counter shaft means is operatively coupled to and extends transversely from the third bevel gear assembly for driving the harvesting means and the threshing and separating means.

14. An agricultural combine as defined by claim 13 wherein the first bevel gear assembly is operatively coupled to at least one hydraulic pump which is fluidically coupled to a hydraulic motor for rotating the ground engaging means.

15. An agricultural combine as defined by claim 14 wherein the inner drive shaft is provided with a sheave and a belt for driving a second sheave operatively coupled to the unloading auger.

16. A self-propelled agricultural combine for harvesting a crop from a field and threshing the harvested crop to separate grain from straw and chaff, the combine comprising:

a chassis having a front and back;
ground engaging means extending downwardly from the chassis, the ground engaging means support the chassis and when rotated, drive the chassis across a field;
a harvesting means extending from the front of the chassis, for harvesting an agricultural crop from a field;
a threshing and separating means located inside the combine, for separating grain from straw and chaff;
a feeder house for directing a harvested crop from the harvesting means inside the combine to the threshing and separating means;
a clean grain compartment is mounted to the chassis and receives the separated grain fro the threshing and separating means, the clean grain compartment is provided with an unloading auger for unloading the compartment;
a swing arm is pivotally mounted to the chassis and is pivotally positioned between an extended and a retracted position on the chassis, a single acting hydraulic
cylinder is mounted to the chassis and the swing arm for extending the swing arm and holding it in its extended position, a biasing spring is mounted to the chassis and the swing arm for retracting the swing arm into its retracted position; and
a prime mover having a first sheave that is operatively coupled to a second sheave mounted on the swing arm by a first belt that extends between the sheaves, the first sheave driving the second sheave and thereby the unloading auger when the swing arm is in its extended position and being decoupled from the second sheave when the swing arm is in its retracted position.

17. An agricultural combine as defined by claim 16 wherein the single acting hydraulic cylinder is fluidically coupled to a constant pressure source of hydraulic fluid, a valve is fluidically positioned between the hydraulic cylinder and the source of hydraulic fluid for coupling and decoupling the source of hydraulic fluid to and from the hydraulic cylinder and in turn extending and retracting the hydraulic cylinder.

* * * * *

UNITED STATES PATENT AND TRADEMARK OFFICE
CERTIFICATE OF CORRECTION

PATENT NO. : 4,843,803
DATED : 4 July 1989
INVENTOR(S) : Joseph A. Teijido, et al.

It is certified that error appears in the above-identified patent and that said Letters Patent is hereby corrected as shown below:

Column 6, line 13, delete "mewans" and insert therefor -- means -- ;

Column 7, line 16, delete "in" and insert therefor -- by -- .

Column 8, line 8, delete "drie" and insert therefor -- drive -- ; same column, line 51, delete "fro" and insert therefor -- from -- ; same column, lines 58 and 59 should not have a paragraph break.

Signed and Sealed this

Sixteenth Day of July, 1991

*Attest:*

HARRY F. MANBECK, JR.

*Attesting Officer*  *Commissioner of Patents and Trademarks*